United States Patent
Wang Lee

[11] Patent Number: 5,966,738
[45] Date of Patent: Oct. 19, 1999

[54] SNAP CLAMP

[76] Inventor: Min-Young Wang Lee, No. 473, Jong-Shan S. Rd., Yung-Kang City, Taiwan

[21] Appl. No.: 08/961,997

[22] Filed: Oct. 31, 1997

[51] Int. Cl.⁶ .................................. A42B 1/06; A42B 3/18
[52] U.S. Cl. ........................................ 2/10; 2/424
[58] Field of Search ................................... 2/8, 9, 10, 15, 2/424; 351/156, 157; 24/3.3, 530, 536, 543, 588

[56] References Cited

U.S. PATENT DOCUMENTS

| | | | |
|---|---|---|---|
| Re. 34,699 | 8/1994 | Copeland et al. | 2/424 |
| 3,673,610 | 7/1972 | Liautaud | 351/156 |
| 4,442,551 | 4/1984 | Hellberg | 2/10 |
| 4,479,738 | 10/1984 | Kubnick | 2/10 |
| 4,856,109 | 8/1989 | Desy et al. | 2/9 |
| 4,976,531 | 12/1990 | Kahaney | 351/156 |
| 5,012,528 | 5/1991 | Pernicka et al. | 2/10 |
| 5,537,724 | 7/1996 | Chou | 24/530 |

*Primary Examiner*—Michael A. Neas
*Attorney, Agent, or Firm*—Harness, Dickey & Pierce, P.L.C.

[57] ABSTRACT

A snap clamp includes a planar part which has a slit area and a resilient flap formed in the slit area. The resilient flap has a fixed end integrally connected to the planar part, a free end opposite to the fixed end, and a resilient protrusion formed on the free end to project normally outward from one side of the planar part. A clamp has two clamping plates to sandwich the planar part therebetween. The clamping plates have opposing inner faces in sliding contact with the planar part. One clamping plate has an engaging slot for engaging the resilient protrusion. As such, the resilient flap is bendable inward to retract inward the resilient protrusion upon insertion in the clamping plates, and is engageable with one of the clamping plate via interengagement of the resilient protrusion and the engaging slot. The resilient flap has a thickness which decreases from the fixed end to the free end so as to prevent the free end from protruding from the planar part in a direction opposite to the resilient protrusion upon retraction of the resilient protrusion.

4 Claims, 5 Drawing Sheets

SNAP CLAMP

BACKGROUND OF THE INVENTION

1. Field of the Invention

This invention relates to a snap clamp, more particularly to a snap clamp that includes a pair of clamp plates to sandwich a planar part and to engage therewith via snap-type engagement means.

2. Description of the Related Art

Generally, a sunglasses assembly has a pair of transparent colored plastic lenses. However, there are sunglasses in which a one-piece transparent lens is screwed and connected pivotally to a pair of bows. Such a connection is somewhat disadvantaged in that the lens easily became loose and moved undesirably relative to the lens frame. Similar problems are encountered in a working headgear which has safety lens for protecting the eyes. Since such safety lens is connected to the headgear by means of screws, the connection therebetween is not firm and stable.

SUMMARY OF THE INVENTION

The object of the present invention is to provide a snap clamp by which lens plates can be attached to a body or part firmly and stably.

According to this invention, a snap clamp includes a planar part which has a slit area and a resilient flap formed in the slit area. The resilient flap has a fixed end integrally connected to the planar part, a free end opposite to the fixed end, and a resilient protrusion formed on the free end to project normally outward from one side of the planar part. A clamp has two clamping plates to sandwich the planar part therebetween. The clamping plates have opposing inner faces in sliding contact with the planar part. One clamping plate has an engaging slot for engaging the resilient protrusion. As such, the resilient flap is bendable inward to retract inward the resilient protrusion upon insertion in the clamping plates, and is engageable with one of the clamping plate via interengagement of the resilient protrusion and the engaging slot. The resilient flap has a thickness which decreases from the fixed end to the free end so as to prevent the free end from protruding from the planar part in a direction opposite to the resilient protrusion upon retraction of the resilient protrusion.

The snap clamp can be used to attach lens plates to a body or part firmly and stably just by inserting the planar part into the clamping plates of the clamp, respectively.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
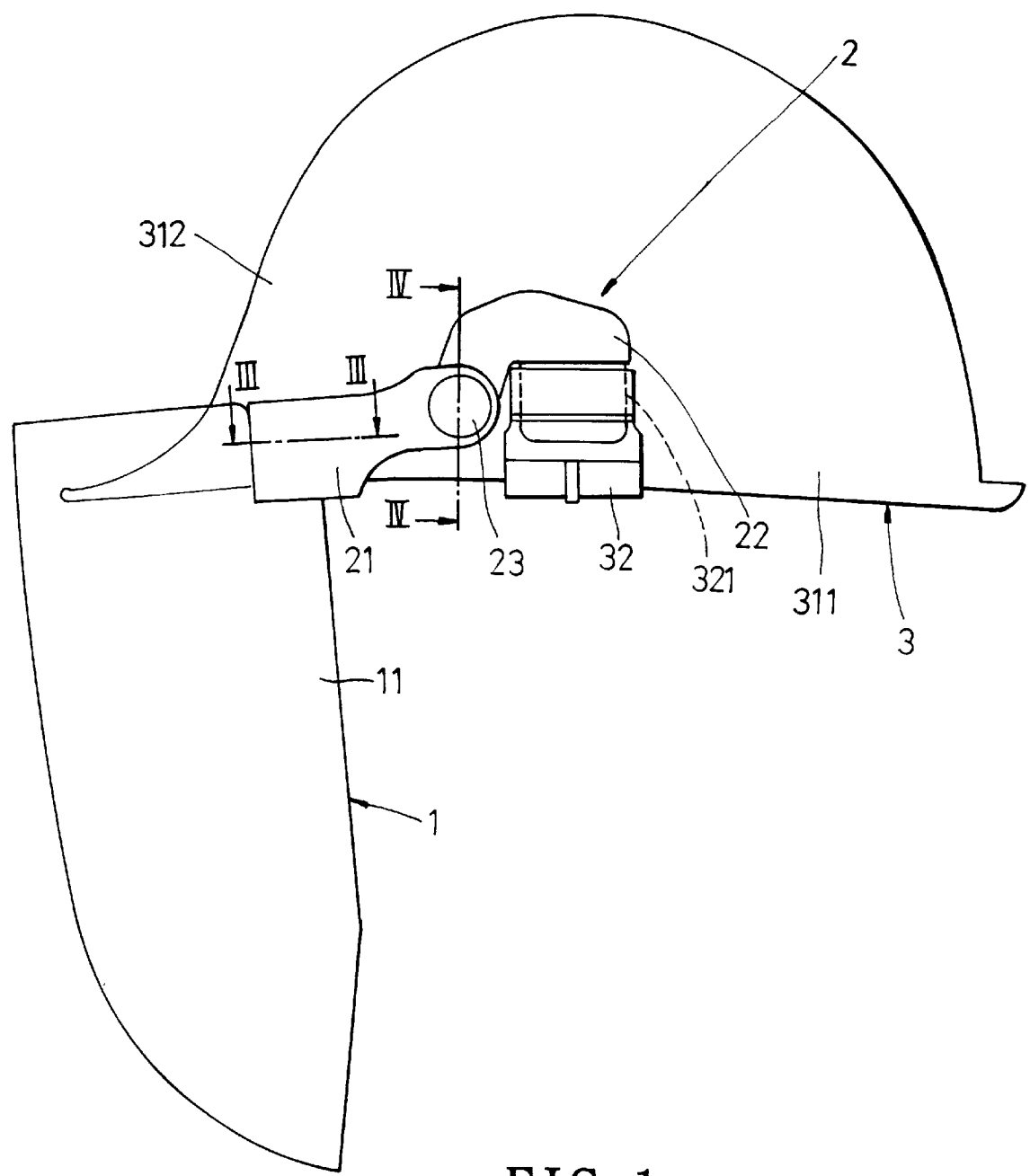
FIG. 1 is a schematic view illustrating a preferred embodiment of a snap clamp according to this invention when used in a headgear.
Figure 2:
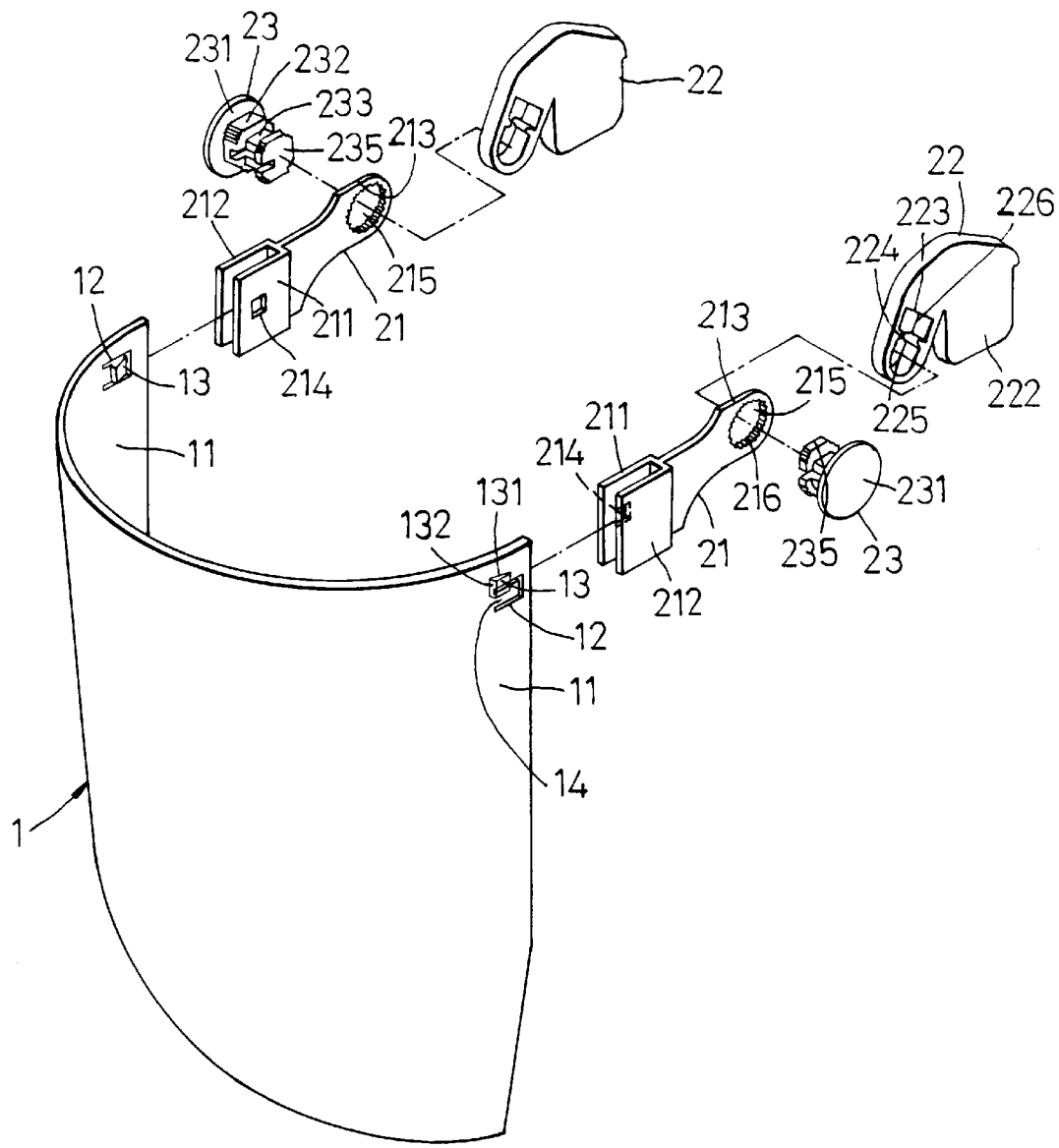
FIG. 2 is an exploded view of the headgear of FIG. 1.

Referring to FIGS. 1 and 2, a headgear is shown to comprise a headpiece 3, and a safety lens unit 1 which is coupled to the headpiece 3 via a coupling device 2, each of which incorporates a preferred embodiment of a snap clamp of the present invention.

The headpiece 3 has two opposite sides 311 which respectively have two projecting portions 32 with insert slots 321, and a front side 312 which interconnects the two opposite sides 311. The safety lens unit 1 is made of plastic and is disposed at the front side 312 of the headpiece 3.

The safety lens unit 1 is a transparent curved plastic plate which has two ends formed as planar parts 11. Each planar part 11 has a slit area 12 and a resilient flap 14 formed therein so as to be substantially coplanar with the planar part 11. The resilient flap 14 has a fixed end which is connected integrally to the planar part 11, a free end opposite to the fixed end, and a resilient protrusion 13 which is formed on the free end. The resilient protrusion 13 has an inclining surface 131 and a stepped stop face 132. The inclining surface 131 rises substantially from the free end to the stepped stop face 132.

There are two clamps 21 that are connected to the planar parts 11 in a snap-fit engagement. Each clamp 21 includes a forked end which is configured to form a pair of clamping plates 211, 212. The clamping plates 211, 212 are spaced apart to sandwich the planar part 11 of the lens unit 1. The clamping plates 211, 212 have opposing inner faces in sliding contact with the planar part 11. The clamping plate 211 has an engaging slot 214 for engaging the resilient protrusion 13. Each clamp 21 further has a pivot joint portion 213 opposite to the forked end. The pivot joint portion 213 has a pivot hole 215 and a plurality of annularly arranged teeth 216 which project into the pivot hole 215.

Two engaging blocks 22 are pivoted respectively to the pivot joint portions 213 of the clamps 21. Each engaging block 22 has a front end which is associated with an adjustment rotary knob 23. The front end of each engaging block 22 has a connecting hole 223 to connect with the rotary adjustment knob 23. The connecting hole 223 has a guide portion 226, a positioning hole 225, and a constricted portion 224 between the guide portion 226 and the positioning portion 225. Each engaging block 22 further has a rear end which is formed with a plug portion 222 to be mounted on the respective side 311 of the headgear 3.

The rotary knob 23 has a head portion 231, a serrated shaft portion 232 which extends from the head portion 231 into the pivot hole 215 of the respective clamp 21, and a neck portion 233 extending from the serrated shaft portion 232 so as to engage the connecting hole 223 of the respective engaging block 22. An enlarged end flange 235 is formed at one end of the neck portion 233 opposite to the serrated shaft portion 232. In addition, the rotary knob 23 is split axially from the enlarged end flange 235 to the serrated shaft portion 232 so that the serrated shaft portion 232 and the neck portion 233 are expandable and retractable resiliently.

Figure 3:
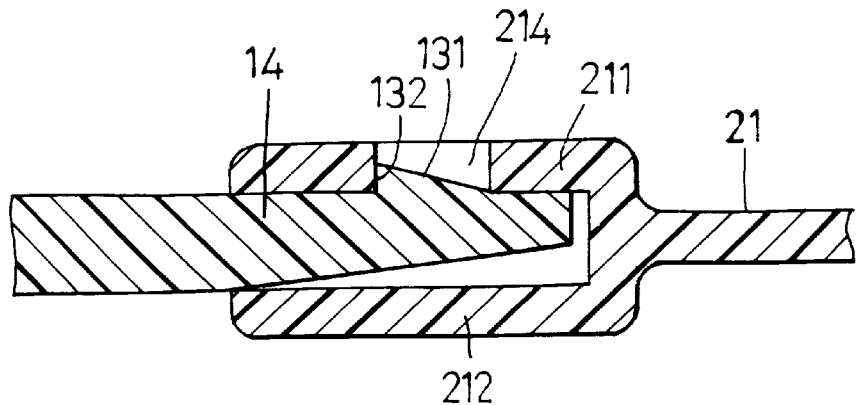
FIG. 3 is a sectional view taken along line III—III in FIG. 1.
Figure 4:
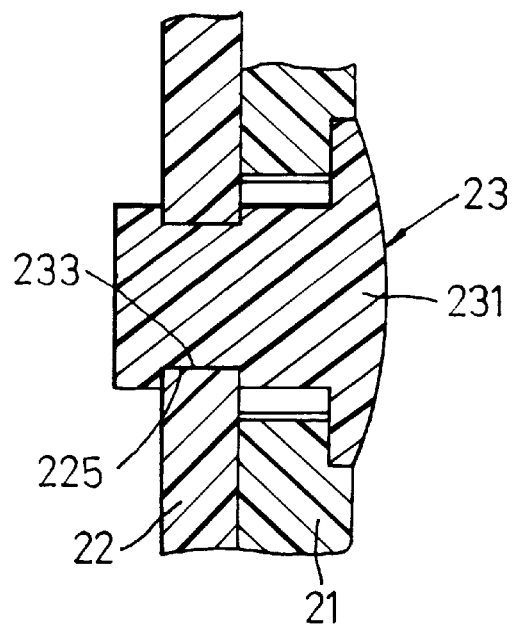
FIG. 4 is a sectional view taken along line IV—IV in FIG. 1.

In assembly, referring to FIGS. 2, 3 and 4, the guide portion 226 of the connecting hole 223 is first aligned with the respective pivot hole 215. Then, the rotary knob 23 passes through the pivot hole 215 and the guide portion 226. The serrated shaft portion 232 is received in the pivot hole 215. The guide portion 226 of the connecting hole 223 permits the enlarged end flange 235 to thread therethrough. The neck portion 233 of the rotary knob 23 is received by the positioning portion 225 after passing through the constricted portion 224. At the same time, the serrated shaft portion 232 engages resiliently the annularly arranged teeth 216 in the pivot hole 215 for adjustment of the relative angular position between the clamp 21 and the respective engaging block 22.

After the clamps 21 are connected to the sides 311 of the headpiece 3, each planar part 11 of the lens unit 1 is inserted in the clamping plates 211, 212 of the respective clamp 21 until the resilient protrusion 13 thereof engages the respective engaging slot 214. Since the resilient flap 14 is resilient and bendable, it retracts inward the resilient protrusion 13 when sliding along the inner surfaces of the clamping plates 211, 212. With reference to FIG. 3, the resilient flap 14 has a thickness that decreases from the fixed end to the free end so that the free end is prevented from protruding in a direction opposite to the resilient protrusion 13 upon retraction of the resilient protrusion 13.

Figure 5:
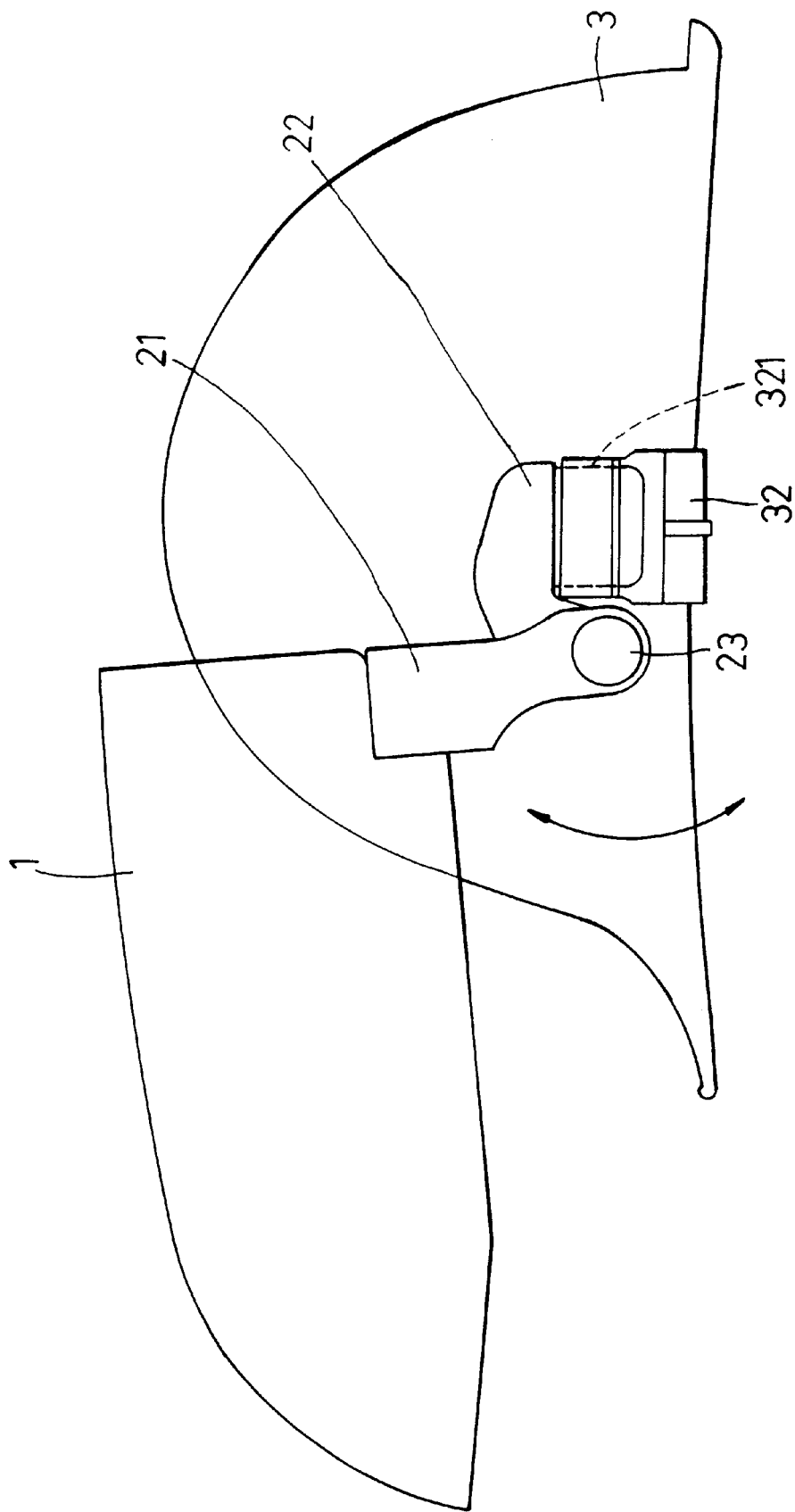
FIG. 5 is a schematic view showing a lens unit of the headgear in a raised position.

Finally, referring to FIGS. 2 and 5, the plug portion 222 of each engaging block 22 is inserted into the respective insert slot 321, thereby coupling the lens unit 1 to the headgear 3 at the front side 312. Moreover, the lens unit 1 can be rotated about the rotary knobs 23 to adjust its angle relative to the headgear 3.

As mentioned above, the lens unit 1 can be easily and firmly attached to the clamps 21 just by inserting the planar parts 11 into the clamping plates 211, 212 of the clamp 21, respectively. In addition, the lens unit 1 can be positioned at a desired angle relative to the headgear 3.

Figure 6:
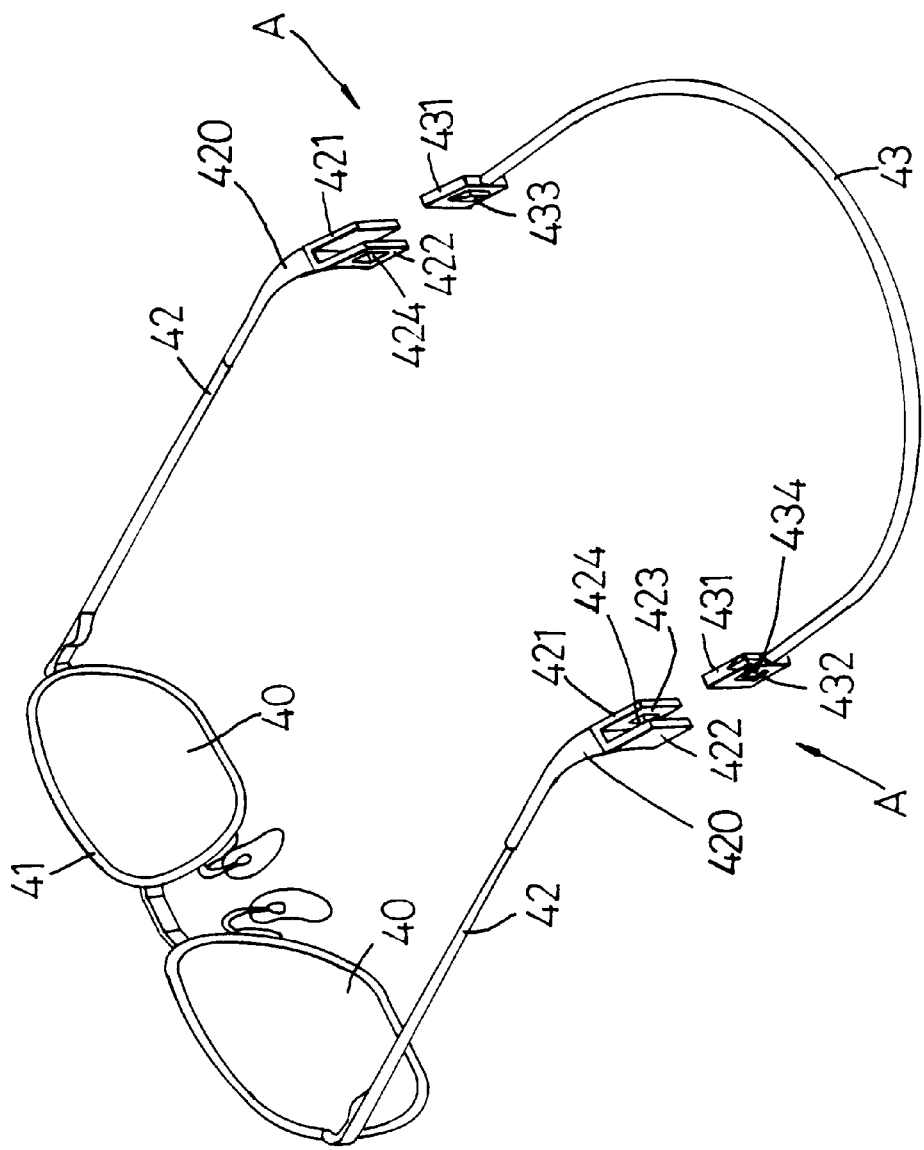
FIG. 6 is an exploded view of an eyeglasses assembly incorporating the snap clamp of the present invention.

Referring to FIG. 6, an eyeglasses assembly 40 is shown to be connected to a hanging band 43 by means of snap clamps (A) . The eyeglasses assembly 40 includes an eyeglasses frame 41 which has a pair of bows 42. A hanging band 43 has two ends for connection with the bows 42. Each snap clamp (A) includes a planar part 431 which is formed integrally with the respective end of the hanging band 43, and a clamp 420 which is integral with the respective bow 42. Each planar part 431 has a construction similar to that of the planar part 11 shown in FIGS. 1–5. Each clamp 420 has a pair of clamping plates 421, 422 which have constructions similar to those of the clamping plates 211, 212 shown in FIGS. 1–5. Each pair of the clamping plates 421, 422 sandwich the respective planar part 431. Each planar part 431 is slit to form a resilient flap 434 which is bendable to retract inward the resilient protrusion 433 formed thereon upon its insertion between the clamping plates 421, 422 via interengagement of the resilient protrusion 433 and the engaging slot 424.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A headgear comprising a headpiece having two opposite sides and a front side interconnecting said two opposite sides;

a safety lens unit disposed at said front side and having two ends for connection with said front side; and a snap clamp to couple said safety lens unit to said headpiece;

said snap clamp including two planar parts integrally and respectively connected to said two ends of said safety lens unit, and two clamps respectively connected to said opposite sides of said headpiece;

each of said planar parts having a slit area and a resilient flap formed in said slit area so as to be substantially coplanar with the corresponding one of said planar parts, said resilient flap having a fixed end integrally connected to the corresponding one of said planar parts, a free end opposite to said fixed end, and a resilient protrusion formed on said free end to project normally outwardly from one side of the corresponding one of said planar parts; and each of said clamps having two clamping plates which are spaced apart to sandwich the respective one of said planar parts therebetween, said clamping plates having opposing inner faces to be in sliding contact with the corresponding one of said planar parts, one of said clamping plates having an engaging slot for engaging said resilient protrusion, each of said clamps having a plate member which includes a forked end with a substantially U-shape to form said clamping plates, said plate member of each of said clamps further includes a pivot joint portion opposite to said forked end;

said resilient flap being bendable inward to retract in said resilient protrusion upon insertion in said clamping plates and being engageable with said one clamping plate via interengagement of said resilient protrusion and said engaging slot, said resilient flap having a thickness that decreases from said fixed end to said free end so as to prevent said free end from protruding from the corresponding one of said planar parts in a direction opposite to said resilient protrusion upon retraction of said resilient protrusion.

2. A headgear as claimed in claim 1, wherein said snap clamp further includes an engaging block pivoted to said pivot joint portion of said plate member of each of said clamps and connected to said headpiece.

3. A headgear as claimed in claim 2, wherein said pivot joint portion has a pivot hole, and a plurality of annularly arranged teeth which project into said pivot hole, said engaging block having one end associated with an adjustment rotary knob, said rotary knob having a serrated shaft portion extending into said pivot hole, said serrated shaft portion releasably engaging said teeth for adjustment of relative angular position between each of said clamps and said engaging block.

4. A headgear as claimed in claim 3, wherein said engaging block has a plug portion formed at an opposite end thereof for mounting on said headpiece.

* * * * *